J. P. STEVENS.
ENGRAVING MACHINE.
APPLICATION FILED FEB. 25, 1901. RENEWED MAY 31, 1904.

962,062.

Patented June 21, 1910.
7 SHEETS—SHEET 1.

Witnesses
Inventor
J. P. Stevens.
by Wilkinson & Fisher
Attorneys.

J. P. STEVENS.
ENGRAVING MACHINE.
APPLICATION FILED FEB. 25, 1901. RENEWED MAY 31, 1904.

962,062.

Patented June 21, 1910.
7 SHEETS—SHEET 5.

J. P. STEVENS.
ENGRAVING MACHINE.
APPLICATION FILED FEB. 25, 1901. RENEWED MAY 31, 1904.

962,062.

Patented June 21, 1910.
7 SHEETS—SHEET 7.

Witnesses
Geo. B. Byrne
John N. Halt

Inventor
J. P. Stevens
by Wilkinson & Fisher
Attorneys

UNITED STATES PATENT OFFICE.

JOSIAH PERCIVAL STEVENS, OF ATLANTA, GEORGIA.

ENGRAVING-MACHINE.

962,062.  Specification of Letters Patent.  Patented June 21, 1910.

Application filed February 25, 1901, Serial No. 48,800. Renewed May 31, 1904. Serial No. 210,578.

*To all whom it may concern:*

Be it known that I, JOSIAH PERCIVAL STEVENS, a citizen of the United States, residing at Atlanta, in the county of Fulton and State of Georgia, have invented certain new and useful Improvements in Engraving-Machines; and I do hereby declare the following to be a full, clear, and exact description of the invention, such as will enable others skilled in the art to which it appertains to make and use the same.

My present invention relates to improvements in mechanism for cutting letters or designs on copper, steel, brass or other metal plates, or upon stone or other material, and is particularly designed for making intaglio engraved plates to be used in plate printing presses, the graver being operated by a mechanism which will accurately reproduce in reverse, or otherwise, any design or pattern which is traced by the tracer-rod; the said design or pattern being a templet upon an enlarged scale of that which is to be reproduced.

My invention further comprises the combination and arrangement of parts hereinafter more particularly described, claimed, and shown in the accompanying drawings, in which:

Fig. 8 represents a back view in elevation of the compound work holder; Fig. 9, a detail perspective view of the tool holder; Fig. 10, a similar view of another form of tool holder, and Fig. 11, a horizontal section of the tool holder shown in Fig. 10. Fig. 12 represents an enlarged end view of the cutting tool or graver shown in Fig. 9, and Fig. 13, represents in enlarged perspective another form of cutting tool. Fig. 14, represents in side elevation a detail view of a power driven cutting tool or graver and its supporting arm, pulleys and belt. Fig. 15, represents an enlarged section taken along the line 15—15, Fig. 1, and looking in the direction of the arrow, showing the type holding rack in side elevation. Fig. 16, is an enlarged perspective view of the type holder, and Fig. 17, is a similar view of another form of the same. Fig. 18, represents a section of the type holding rack taken on the line 18—18, Fig. 15 and looking in the direction of the arrow. Fig. 19 represents a cross sectional view of the type holder shown in Fig. 17, and Fig. 20, represents a letter or design produced by means of the section lining device carried upon the type holding rack.

Similar letters and numerals refer to similar parts throughout the several views.

A represents the bed of the machine which is rigidly mounted upon the supports A′, A², one end of the said bed being preferably elevated with respect to the other, as shown. Upon the lower end of this bed, I mount the type holding rack in which the pattern design or templets to be traced are carried. This type holding rack comprises, among other parts, a horizontal fixed bar B, and a movable bar B′, the former being secured to a support $b$ which is rigidly secured to the bed of the machine, as shown, or in any desired manner, while the bar B′ is carried by hand screws $b'$, $b'$, which screw into the bar B. See Fig. 15. In this manner the two bars B and B′ may be brought together or separated as desired and being so constructed, form clamping jaws, between which the type C may be held directly. It is preferred, however, that the type be mounted in type holders and these held between the jaws B, B′, as hereinafter described.

D represents one of the type holders, which consists of two gripping boards $d$ and $d'$, (see Fig. 16,) having their edges brought together or separated by the long shank binding screws $d^2$.

When the patterns are letters, they are usually, when not script, made in the form of the type C, each having a flange or lip $c$ along its upper edge, which is adapted to be clamped between the gripping boards $d$, $d'$, and held as shown. The type are thus set up in lines corresponding to the lines of the work to be done and the type holders slipped into the type holding rack, and securely held therein by tightening the screws $b'$, which cause the jaws B and B′ to grip the tongue or flange $d^3$ which extends along the upper edge of the member $d$ of the type holder.

In operating the machine, if there are several lines to be engraved, the type are set up in as many type holders and these slipped into the type holding rack successively as the preceding ones are exhausted, constituting a simple operation which may be accomplished with great rapidity and very little interruption to the operator.

The type holder D' is used for setting up type of script, which are much more difficult to keep in alinement than the ordinary style, due to the necessary incline and lengths of the strips generally used in producing this alphabet. This type holder D' (see Fig. 17), comprises a flat body piece $d^4$ having the two longitudinal parallel channels $d^0$ formed by the overlapping edges $d^5$, while along the upper edge extends a lip $d^6$ similar to the one $d^3$ of the holder D. The type, such as C', are slipped into the channels $d^0$ with just enough friction to keep them well in position and when set up, appear as shown in Fig. 17.

The holder D' is held in the rack in the same way as the holder D; that is to say, by having its lip $d^6$ clamped between the bars B and B'. This holder D' may be made of metal, all in one piece, or may be made of wood, in one piece, or it may be either wood or metal and made in several pieces; that is to say, the channels may be formed by securing the portions $d^5$ to the body portion, instead of making them integral as shown, and likewise with the lip $d^6$.

Figures 15, 16, 17, 18, 19, 20:
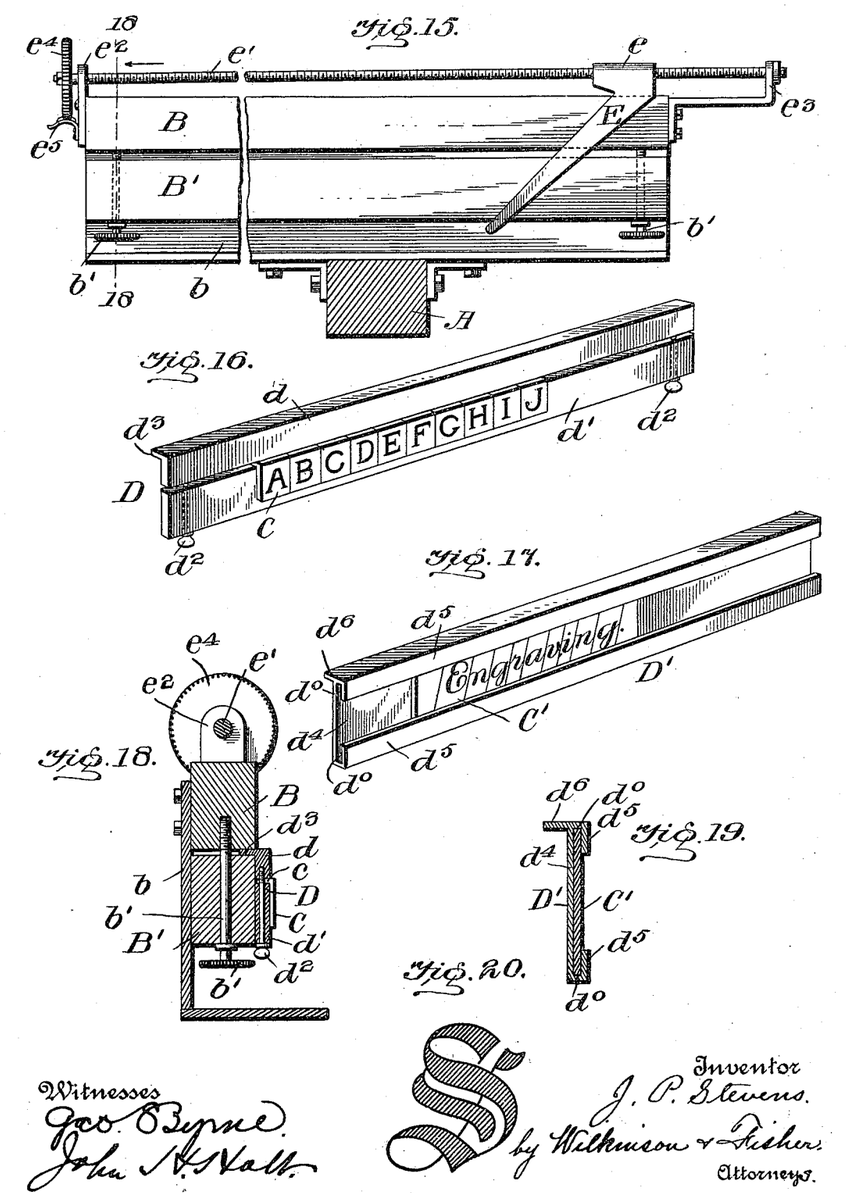

For the purpose of producing uniformity and delicacy in engraving cross-hatched letters or designs, such for example as shown in Fig. 20, I provide the ruling device herein shown mounted upon the type holding rack and comprising an inclined ruling edge E, having a screw-threaded head $e$, which engages and travels upon the screw $e'$ mounted loosely in the bearings $e^2$ and $e^3$, and then extending across the top of the type rack. The screw $e'$ is propelled and held fast in the desired positions by the divided or toothed disk $e^4$ mounted fast upon one end of it and engaging a spring ratchet or retaining piece $e^5$. As the disk $e^4$ is rotated one, two, three or more divisions at a time the ruling edge will travel a corresponding distance and in this way passes step-by-step over the faces of the letters and at each point of rest the tracer is put in the upper part of the stroke and drawn along over the letter and along the ruling edge, producing an effect in cross-hatching such, for example, as shown in Fig. 20, and in actual practice delicacy and regularity of shade and hatching, unapproachable in manual work. This ruling edge E may be turned upward and out of the way when not in use, or for the purpose of placing letters beneath it, when setting up the type or placing the holders in the type rack.

Figure 6:
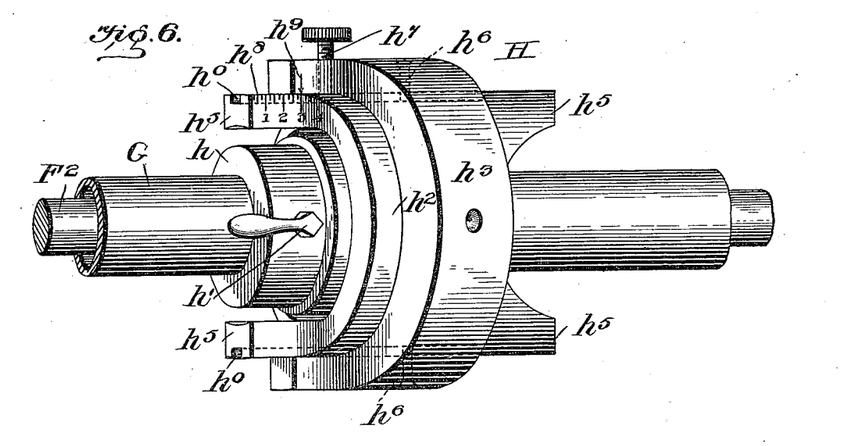
Fig. 6, an enlarged detail perspective view of the gimbal support for the tracer rod, and Fig. 7, an end view of the same showing the gimbal rings in central transverse section.
Figure 7:
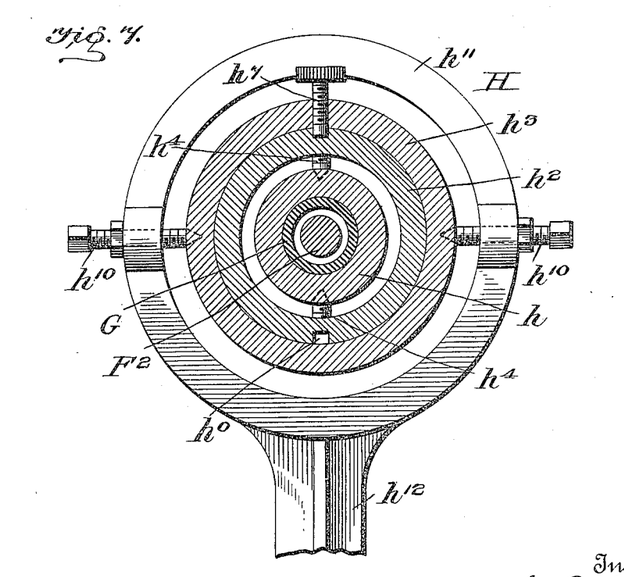

The instrument or device for tracing the patterns or type, set up in the holder as described, comprises a tracing point F, preferably detachably secured to the end of a spindle F', the said spindle being made hollow for a portion of its length to receive one end of a long rod $F^2$ and thus form a telescopic connection therewith, both spindle and rod being carried within a hollow rod G and rotatably mounted therein in the bushings $g$. Whenever the spindle F' is rotated its motion is transmitted to the rod $F^2$ by the pin $f$ carried by the latter and which slides in the slot $f^0$ of the spindle. The pin $f'$ passing through the tracing point enables the operator, by placing it between his fingers, to easily rotate the tracer to the various extents required and in this manner keep the cutting edge of the graver Q constantly at the proper angle, the motion being transmitted to the said graver through the finger $f^2$ pivoted in the end of the rod $F^2$, as will hereinafter appear more fully. The pin $f'$, held by the operator as described, and its related parts, constitute means by which the graver, unseen by the operator, can be rotated with positive motion, and yet the operator can by a sense of touch always tell the direction in which the cutting tool is moving. It is by means of the rod G and its connected parts that the proper motion is transmitted from the tracer to the graver, and for the sake of clearness, the end of this rod carrying the tracer will be designated the tracing end, while its other end will be designated the working end. In order, therefore, to impart the proper relative motion to the working end of the said rod with respect to that of the tracing end, I provide the adjustable gimbal support H. The rod G passes through the inner gimbal ring $h$ and is rigidly held therein by means of the clamping screw $h'$, which allows the position of the rod to be adjusted relative to the ring, and when so adjusted, to be held fast. This gimbal support comprises quite an important feature of my invention and is shown most clearly in Figs. 6 and 7. The second ring of the gimbal is composed of two adjustable sliding members $h^2$ and $h^3$, the ring $h^2$ being mounted upon the pivots $h^4$. See Fig. 7. This ring $h^2$ is provided with forward and rear extensions $h^5$ both top and bottom, or, if desired, only at its top. See Fig. 6. The member $h^2$ is adapted to slide in the member $h^3$ in a direction coincident with the axis of the rod G and for this purpose is provided with the grooves $h^0$ into which pass the pins $h^6$ preventing relative rotary movement between the two rings, but at the same time allowing one to slide laterally within the other. Only one pin $h^6$ may be employed if desired, though two will add greater rigidity to the structure. The member $h^2$ is held from lateral movement after adjustment by the thumb screw $h^7$, and the amount of adjustment is indicated upon the scale $h^8$ on the extension $h^5$ by means of the indicating mark or its equivalent $h^9$ carried by the member $h^3$. When the two points which constitute the bearings of the outer gimbal ring are in the same plane as those of the inner ring, the designs or letters will be accurately reproduced in proportions whether enlarged or diminished. If, however, the outer section $h^3$ of the outer gimbal ring is slid forward of the center, the design or letters will be reproduced extended or "fat", while if the outer section $h^3$ is slid to the rear of the center, the designs or letters will be reproduced compressed or "lean". This permits the production of a variety of letter effects with the same alphabets. The member $h^3$ of the outer gimbal ring is pivoted upon the adjustable pivot screws $h^{10}$, $h^{10}$, carried in the circular gimbal frame $h^{11}$ upon the upper end of an upright $h^{12}$ provided with the base plate $h^{13}$ having the guide flanges $h^{14}$. This base plate rests and is adapted to slide upon the side bar I and is clamped to the said bar in the desired position by means of the binding screw $h^{15}$ operated by the milled head $h^{16}$, the said screw passing through the plate $h^{17}$ secured to the base plate by means of the bolts $h^{18}$, engaging the lower face of the side bar I. This bar I is rigidly secured to the angle irons or supports $i$ bolted to the base of the machine as shown. The object in thus mounting the gimbal support is to change the size of the reproduction; that is, to vary the proportion of the reproduction to the templet. This is done by loosening the binding screw $h'$ of the inner gimbal ring and also loosening the screw $h^{15}$ under the bar I which will permit the frame carrying the gimbal rings to be moved either forward or backward, forward toward the work for diminishing the size of the reproduction and backward toward the tracer for enlarging it. The bar is graduated as at $i'$ so that any size of reproduction may be made according to scale and with mathematical precision. This change may be effected with great rapidity and ease.

It will be seen that if the graver or cutting tool were mounted directly on the working end of the rod $F^2$ and the tracer passed over a line, the graver would not produce a correct reproduction, as its motion would necessarily be in the arc of a circle, producing a deep cut at the center of the line and shading off toward insignificance at the end. Moreover, unless the cutting tool were always at right angles to the plate, the thickness of the line cut by it would vary in different portions of the cut; making, for instance, a wide line when cutting extremes, and a hair line when cutting in the middle between said extremes. I overcome this difficulty by means of a novel compensating device and manner of supporting the cutting tool or graver whereby the cutting tool is held at a constant angle with the plate, preferably a right angle, irrespective of the vertical or lateral angle through which the tracer rod is swung. This compensating device comprises, among other parts, a depending bracket or yoke J having at its upper end a collar $j$ which fits over the working end of rod G and is clamped thereto by means of the screw $j'$. Pivoted between the yoke members $j^2$ upon center bearings is the compensating bar K, the upper end of which terminates in a ball $k$, provided with an opening $k'$ through which the end of the rod $F^2$ passes. The ball $k$ is held between spring jaws $k^2$ and with them forms a ball and socket or universal joint, the pressure of the jaws against the ball being adjusted by means of the screw $k^3$, see Fig. 1. The jaws or sockets $k^2$ in which the ball $k$ is carried are secured fast to a frame L comprising a transverse arm $l$, a longitudinal one $l'$, and the brace $l^2$. This frame is pivoted at the points $l^3$, $l^3$, in the frame M, with the member $l'$ as an axis, and the frame M is in turn pivoted at the points $m$, $m$, in the supports $m'$. The frames L and M thus together constitute a compound frame, the member L of which is capable of movement in two planes at right angles to each other, therefore, the ball and socket carried by the end of the member $l$ may be moved either in a vertical plane or a horizontal plane or may describe a curve of any character. In this way, the movement of the cutting tool or graver, which is carried by the said compound frame, is an exact reproduction of the movement of the tracer either enlarged or diminished, no matter at what angle the tracer is held. The frame M is returned to its central position by the springs $m^2$ secured to it and to the stationary uprights $m^3$.

The graver Q is carried by a swinging tool holder N, the latter being secured fast at one end to a vertical bar $n$ mounted at its ends upon very accurately centered pivots in the frame $n'$ and the frame $n'$ is secured fast to the member $l$ of the said compound frame. This manner of mounting the tool holder, by which it is nearly or practically balanced, renders the graver very sensitive, as the slightest pressure in either direction will affect the work done by it. This swinging tool holder N, is most clearly shown in the enlarged detail view Fig. 9, and comprises a preferably straight bar $n^3$ to which is rigidly secured the member $n^4$, forming with the said bar a forked end in which is journaled the revoluble tool-post $n^5$ provided with a collar $n^6$ for taking up the lateral play.

P represents the tool socket secured fast to the tool-post by the set screw $n^7$. In this socket is held the diamond pointed tool or graver Q made rigid by means of the set screw $n^8$. In practice the tool Q is so adjusted in its holder that its cutting point is always concentric with the bearings of the tool post. The tool Q is provided with a diamond cutting point $q$ embedded in its end as shown, its shape being shown most clearly in Figs. 9 and 12, being that of the steel points generally used by copper plate engravers.

The tool-post $n^5$ carries at its opposite end from the graver a forked spur R secured fast upon the said post by the set screw $r$. Between the forked members of this spur R passes the pivoted finger $f^2$ of the telescope-rod or live spindle $F^2$, the said members being wide enough apart to allow the finger perfect freedom of movement. By means of this connection, rotary motion is imparted from the spindle $F^2$ to the tool post, whereby the cutting edge of the graver may be gradually turned to correspond with the curve or direction of the line to be cut, exactly in the same manner as if the graver were held in the hand of the operator.

T, represents the plate or other body upon which the engraving is done and U the compound work holder. This compound work holder comprises two jaws $u$ and $u'$, the latter sliding into the former and being worked by the screw $u^2$, so that when the lips of the jaws are brought toward each other they will grip the edges of the plate to be engraved and hold it firmly. If the plate be too large to fit between the jaws, it may be held between the pins $u^3$ which may be inserted in the desired holes $u^0$, the clamping being effected by operating the screw $u^2$ as in the former case.

Figure 3:
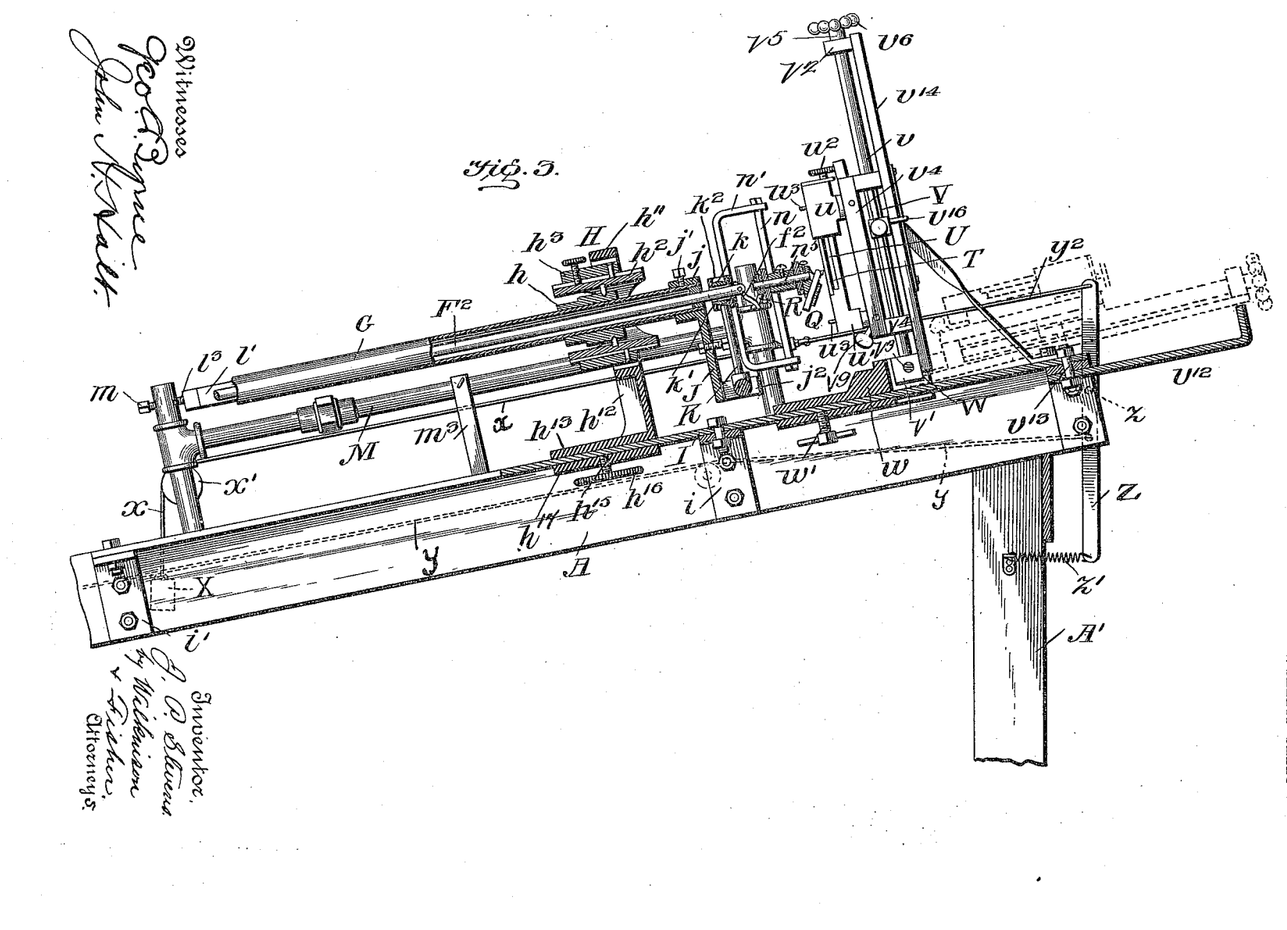
Fig. 3, a side elevation partly in central vertical section, of the engraving or head end of the machine.
Figure 4:
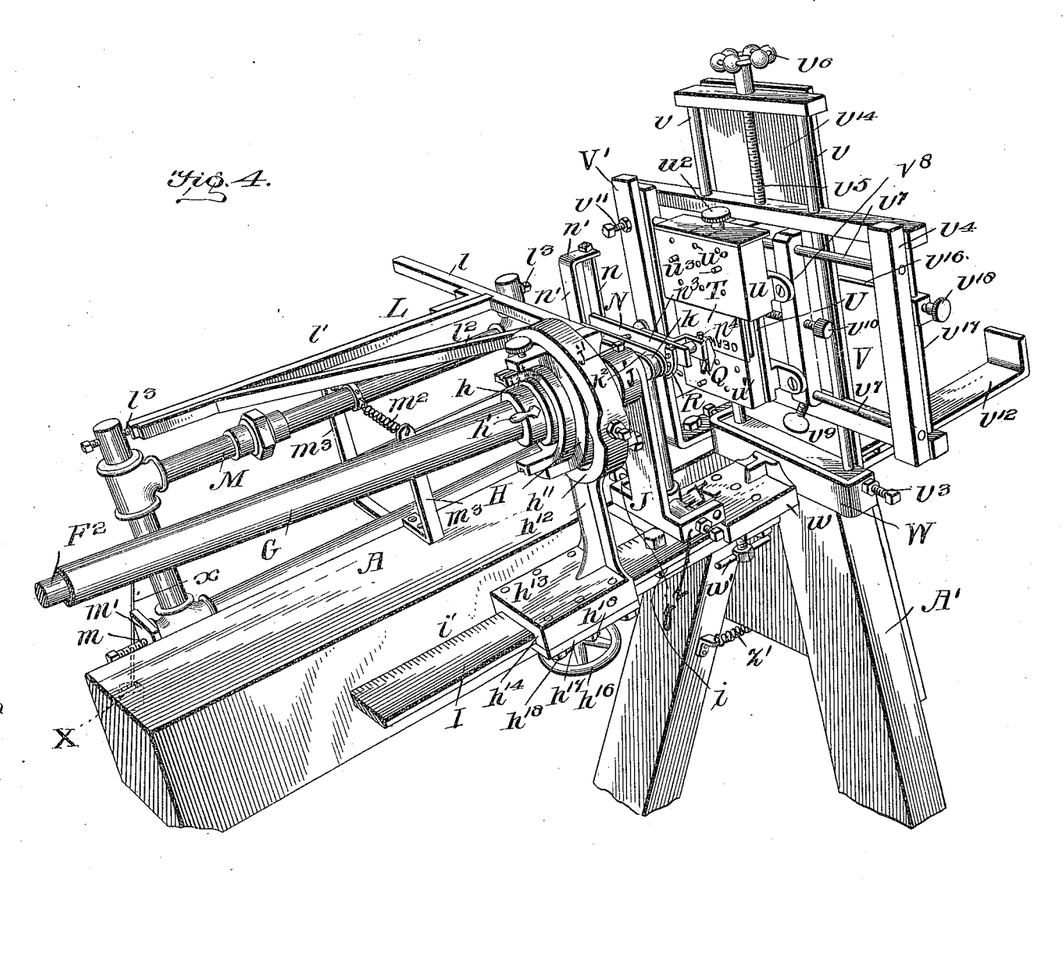
Fig. 4, a perspective view of the same parts.

The work holder U is capable of adjustment as a whole both vertically and horizontally by mounting it upon the swinging compound frame V, which comprises, among other parts, the two parallel rods $v, v$, secured together at their lower ends by the cross bar $v'$ and at their upper ends by the bar $v^2$. The lower bar $v'$ is pivoted upon bearings $v^3$ which are carried by a yoke W secured to or integral with a block $w$ which is mounted to slide upon the side bar I being clamped thereto by the screw $w'$ so that in this way the position of the whole frame and work holder may be changed at once. Adapted to slide upon the rods $v, v$, is a transverse frame $v^4$ having movement imparted to it by the screw $v^5$ operated by the hand wheel $v^6$. This frame $v^4$ carries two parallel rods $v^7, v^7$, upon which the bars $v^8$ carrying the work holder are adapted to slide. Therefore, it will be seen that when the holder is in the working position shown in Fig. 4, vertical movement may be imparted to the work holder as a whole by operating the screw $v^5$ and horizontal movement may be imparted to it by loosening the set screw $v^9$ and sliding the holder on the rods $v^7, v^7$, until it is in approximately the correct position, when more accurate adjustment may be had by operating the screw $v^{10}$, which may be a micrometer arrangement by which the adjustment may be made with the utmost precision. By being pivoted in the yoke W, as described, the work holder may be thrown forward for placing the plate in the holder, or for inspecting the work and when raised again brings the work back exactly to the same position that it previously occupied, permitting the work to be renewed where left off. In its normal position this compound work holder and frame tips past the vertical position and rests against the support V' mounted upon the bed of the machine and provided with the banking screw $v^{11}$ by which the position of the holder may be accurately adjusted. When the compound frame and work holder are tilted back, as shown in dotted lines, Fig. 3, they are supported by the arm $v^{12}$ bolted to the side bar I as at $v^{13}$. On the back of this work holder frame is attached a soft pine board or its equivalent $v^{14}$, to which may be secured a finished piece of work $v^{15}$ as a guide to be used in adjusting the position of the plate being engraved. The guide $v^{15}$ is usually a copy printed from another plate, but may be simply a series of lines for changing the position of the plate worked upon from line to line. The operator is enabled to properly effect this change by means of an index or pointer $v^{16}$ secured to the rod $v^{17}$ by the thumb screw $v^{18}$, which, passing over the face of the guide enables the operator to raise or lower the work in accordance with the spacing on the guide, thus doing away with all measuring for the spacing between lines.

Figures 1, 2:
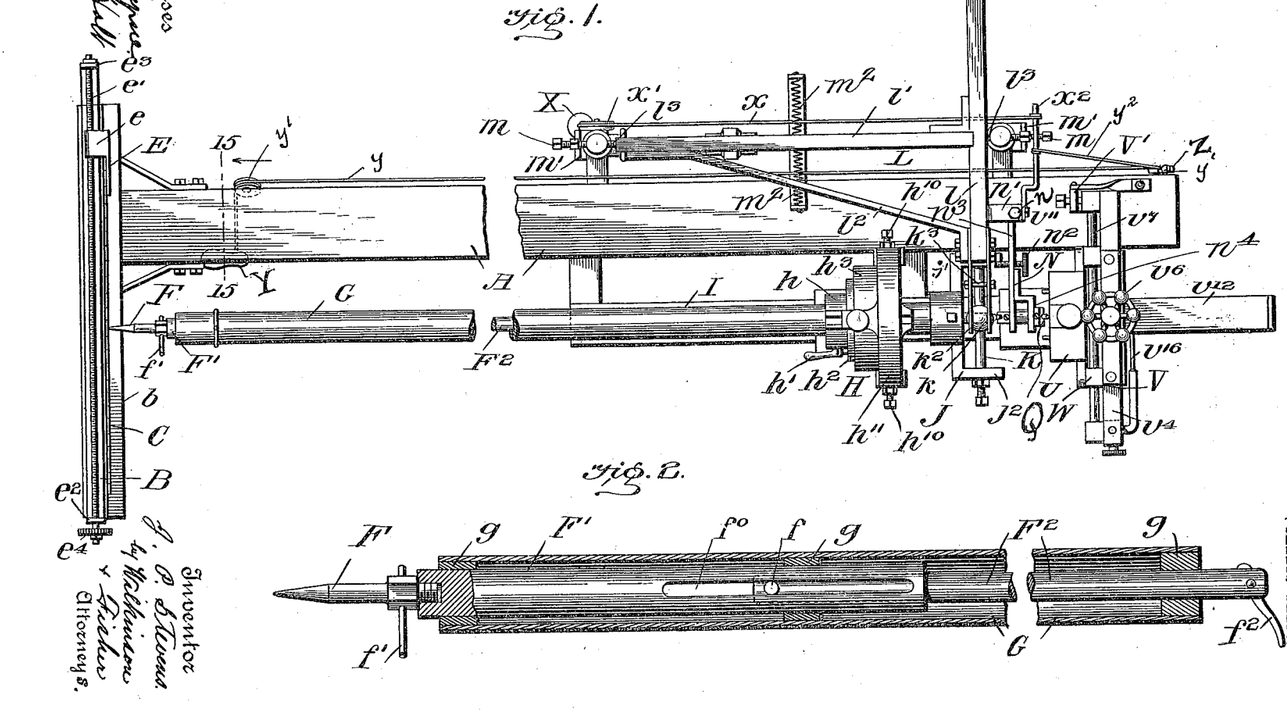
Figure 1 represents a top plan view of the machine embodying my invention.
Fig. 2, an enlarged detail central sectional view of the telescopic tracing rod.
Figure 5:
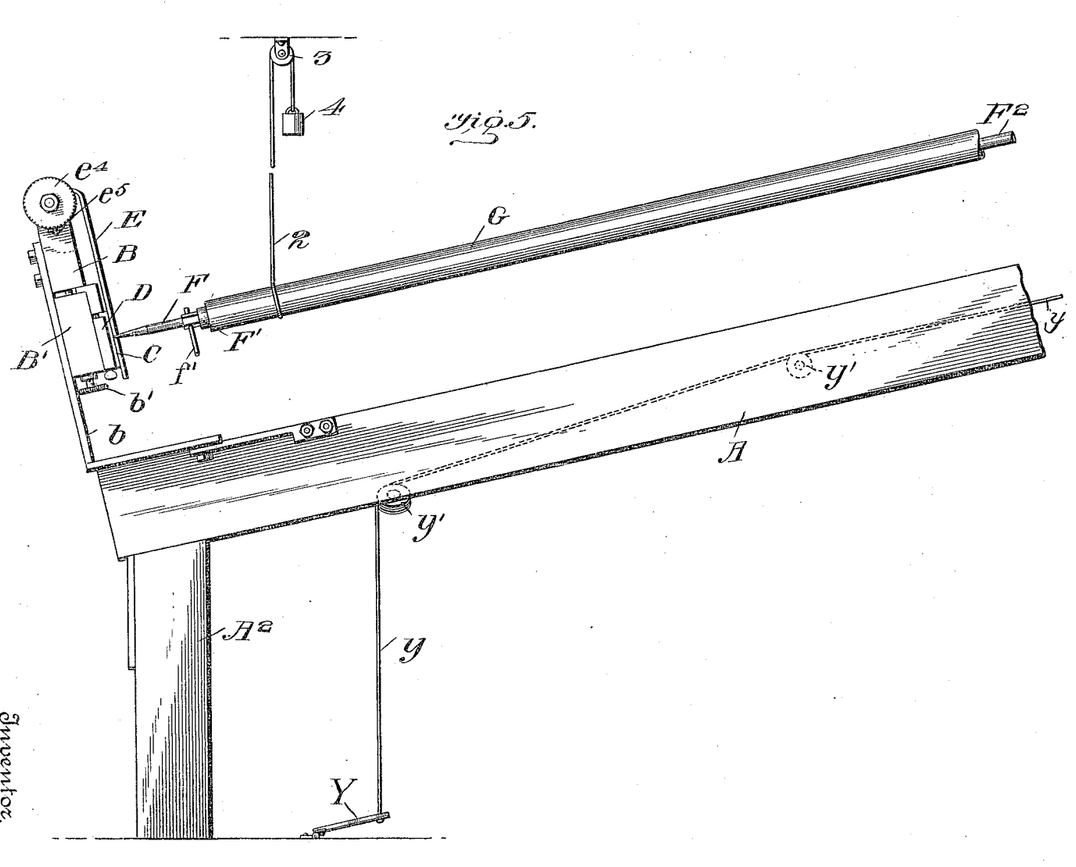
Fig. 5, a side elevation of the tracing or tail end of the machine.

The pressure of the graver against the work is caused by the weight X suspended by a cord or its equivalent $x$, which passes over a roller $x'$, and on to the end of the arm $x^2$, which is rigidly connected to the pivoted bar $n$ which carries the tool holder. Thus, it will be seen that movement of the arm $x^2$ (Fig. 1) to the left will send the graver against the plate, whereas movement of the said arm in the opposite direction will cause the graver to recede from the work, so that by varying the position of the said arm $x^2$ the said graver may be held against the work or plate or thrown out of engagement altogether. While the operator is tracing the pattern by hand he may decrease the degree of the pressure of the graver, or throw it out of action by operating the pedal Y (see Fig. 5) located preferably near the tracing end of the machine. This pedal is secured to a cord or wire $y$ which passes over guide rollers $y'$ to the other end of the machine where it is attached to the lever Z pivoted to the bed of the machine as at $z$, and from the upper end of this lever passes a cord $y^2$ to the arm $x^2$, the lever Z being returned to its normal position after operation by the weight X. The shock of checking the weight X suddenly when it reaches the lower end of its travel is taken up by the cushion spring $z'$ operating on the end of the lever Z. Thus, when the pedal Y is pressed down, the upper end of the lever Z will be sent forward, which will send the arm $x^2$, as shown in Fig. 1, to the right and this will release the pressure of the graver upon the work or withdraw it altogether from engagement, according to the force applied to the pedal. It will be seen, therefore, that, by virtue of the telescopic connections between the tracer and rod $F^2$, the movement of the tracer with respect to the depth of the cut is entirely independent of such movement of the graver.

The tracing end of the rod G is supported by a cord 2 which passes over a suitably located pulley 3 and counterbalanced by a weight 4. See Fig. 5. This arrangement relieves the strain which would otherwise be upon the hand of the operator.

Figures 8, 9, 10, 11, 12, 13, 14:
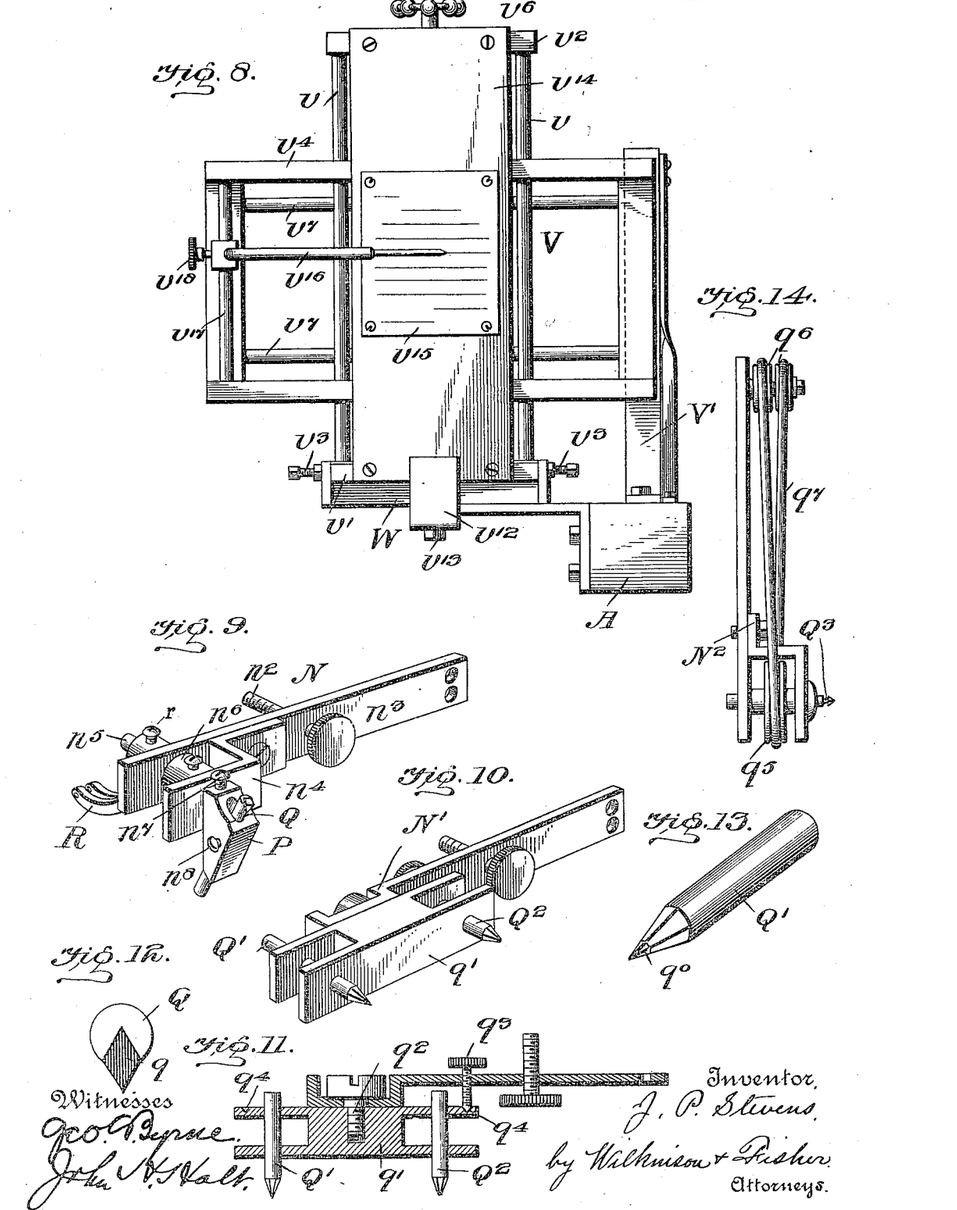

In Fig. 13, I have shown a diamond pointed graver or cutting tool $Q'$ somewhat different from the one Q. This tool $Q'$ comprises a steel or other suitable shank, in the point of which is embedded a diamond $q^0$, which is brought to a point in six distinct faces, the practical effect of this form of point being that it will present a cutting angle or edge no matter which way it is moved. If desired, the number of faces stated may be increased or diminished. This tool, unlike the one Q, when in the holder is held rigid and does not revolve or have movement independent of the holder during the operation of engraving.

In Figs. 10 and 11 I have shown a form of tool holder embodying the turret principle, in which the gravers $Q'$ and $Q^2$ are mounted rigidly in a rotatable block $q'$ carried by the screw stud $q^2$. By means of this form of tool holder, we may employ a graver having a fine point, as the one $Q'$, and another having a point not so fine, such as the one $Q^2$, and when the fine lines have been cut by the graver $Q'$, by simply turning the block or turret $q'$ around, the blunt tool $Q^2$ is brought into the operating position. The said block or turret is secured in the proper position by the thumb screw $q^3$ which engages either of the cavities $q^4$.

In some classes of work it is desirable to employ a power driven cutting tool in which case the regular tool holder N is simply removed and the power driven one substituted. In Fig. 14, I have shown a form of such power driven tool $Q^3$ revolubly mounted in the forked end of the tool holder $N^2$ and provided with the driving pulley $q^5$ and idlers $q^6$, over which passes the belt $q^7$ which may be driven in any suitable way, a desirable method being to locate a small electric motor near the machine and drive the belt by it, as is often done with dentists' instruments. The tool $Q^3$ thus becomes a very effective routing tool and is especially desirable where there are large quantities of metal or other material to be removed.

Having thus described a form of my invention, I do not wish to confine myself to the specific details thereof as the same may be varied without departing from the spirit of my invention, but

What I do claim and desire to secure by Letters Patent of the United States, is:—

1. In an engraving machine, the following instrumentalities, viz.: a pattern holder, a work holder, a rotatable spindle carrying on one end a tracing point, a pivoted support for said spindle, a graver, and rotating means forming a positive connection between said spindles and said graver, said rotating connection composed of two coöperating members rotating with said spindle and graver, and forming means by which the said graver receives rotary motion by the actual rotation of said tracing point and spindle.

2. In an engraving machine, the following instrumentalities, viz.; a pattern holder, and a work holder, a rotatable spindle carrying at one end a tracing point, a pivoted support for said spindle, a graver, a rotatable tool post in which said graver is mounted, a spur and a fork rotatable with said spindle and tool post and forming connecting means therebetween.

3. In an engraving machine, the following instrumentalities, viz.; a pattern holder, and a work holder, a tracer rod and a pivotal support therefor, a rotatable spindle carried by said tracer rod and provided at one end with a tracing point, a revoluble tool post, a graver carried thereby, means composed of two coöperating members rotating with and forming a direct positive connection between said tool post and one end of said spindle for rotating said tool post by the axial rotation of said tracing point and spindle.

4. In an engraving machine, the following instrumentalities, viz.; a pattern holder and a work holder, a tracer rod and a pivotal support therefor, a rotatable spindle carried by said tracer rod and provided at one end with a tracing point, a pin carried by said tracing point for imparting axial rotation to said point and spindle, a rotatable tool post, a cutting tool or graver carried thereby, a bifurcated spur carried by said tool post, a finger carried by said spindle and engaging said spur whereby the axial rotation of said spindle and tracing point is imparted to the said tool post.

5. In an engraving machine, the following instrumentalities, viz.; means for supporting a pattern, and means for holding the work in said machine, a tracer rod and a pivotal support therefor, a bracket carried by one end of said rod and a compensating bar carried by said bracket, a pivoted frame, operative connection between said compensating bar and said frame, a swinging tool holder carried by said frame, a graver, a rotating tool post upon which said graver is mounted, and means for imparting the rotary motion of the tracer rod to the said tool post.

6. In an engraving machine, the combination with an adjustable work holder, of a swinging tool holder, a graver carried by said tool holder, a frame carrying said tool holder, a tracer rod, gimbals forming pivotal supports for said rod, a bracket secured at one end of said rod, a compensating bar pivoted in said bracket, a universal joint connecting said compensating bar with said frame, and means for supporting a pattern.

7. In an engraving machine, the combination with an adjustable work holder, of a swinging tool holder, a graver carried by said tool holder, a pivoted frame carrying said tool holder, a telescopic tracer rod, gimbals forming pivotal supports for said rod, a bracket secured to one end of said rod, a compensating bar pivoted in said bracket, a universal joint connecting said compensating bar with said frame, and means for supporting a pattern.

8. In an engraving machine, the combination with an adjustable work holder, of a swinging tool holder, a graver carried by said tool holder, a pivoted frame carrying said tool holder, a telescopic tracer rod, adjustable gimbals forming pivotal supports for said rod, a bracket secured to one end of said rod, a compensating bar pivoted in said bracket, a universal joint connecting said compensating bar with said frame, and means for supporting a pattern.

9. In an engraving machine, the combination with an adjustable work holder having compound sliding jaws, of a swinging tool holder, a graver carried by said tool holder, a pivoted frame carrying said tool holder, a telescopic tracer rod, adjustable gimbals forming pivotal supports for said rod, a bracket secured to one end of said rod, a compensating bar pivoted in said bracket, a universal joint connecting said compensating bar with said frame, and means for supporting the pattern to be reproduced.

10. In an engraving machine, the following instrumentalities, viz.; a work holder and a pattern holder, a swinging tool holder pivoted at one end, a graver carried by said tool holder, a pivoted frame in which said tool holder is pivoted, a second pivoted frame in which said first frame is pivoted, a tracer rod and compensating movement communicating connection between said tracer rod and first frame, a rotatable spindle carried by said tracer rod and provided at one end with a tracing point, and rotating connecting means between said spindle and said graver.

11. In an engraving machine, the combination with the cutting tool or graver, of a rotatable tool post upon which said tool is carried, a tool holder in which said post is journaled, a bifurcated spur mounted to rotate with said tool post, a tracer rod having a rotatable spindle, a finger pivoted in the end of said spindle and passing between the bifurcations of said spur whereby the rotary motion of said spindle is communicated to said tool post, means operated by said tracer rod for imparting universal movement to said tool holder, a tracer by which said spindle is operated, and means for supporting the work and design to be reproduced in said machine.

12. In an engraving machine, the combination with the cutting tool or graver, of a rotatable tool-post upon which said tool is carried, a tool holder in which said post is journaled, a bifurcated spur mounted to rotate with said tool post, a pivoted telescopic tracer rod having a rotatable spindle, a finger pivoted in the end of said spindle and passing between the bifurcations of said spur, whereby the rotary motion of said spindle is communicated to said tool post, means operated by the tracer rod for imparting universal movement to said tool holder, and means for supporting the work and pattern to be reproduced.

13. In an engraving machine, the combination with the tracer rod, and means for supporting the pattern to be traced, of a pivotal support for said rod, a depending bracket carried by one end of said rod, a pivoted upright compensating bar terminating at its upper end in a ball and socket joint, a pivoted frame having resilient jaws constituting the socket of said joint, a swinging tool holder carried by said frame, a cutting tool or graver carried by said holder, and having universal movement, and means for supporting the work in said machine.

14. In an engraving machine, a tool holder, comprising a bar, an off-set member secured fast to said bar and forming with one end of the same a fork, a tool post journaled to rotate in the members of said fork, a bifurcated spur fixed upon one end of said post, and a tool socket fixed upon the other end of the same, substantially as described.

15. In an engraving machine, the combination with a cutting tool or graver, of a swinging tool holder, a pivoted bar to which said holder is secured, a bracket in which said bar is pivoted, a frame carrying said bracket, upright pivoted supports in which said frame is pivoted, a tracer rod and compensating universal connection between said rod and said frame, means for supporting said rod, and means for holding the work and the pattern in said machine, substantially as described.

16. In an engraving machine, the combination with the bed of the machine, of a bar rigidly secured thereto, a bracket having a base adapted to slide upon said bar, means for clamping said bracket to said bar in the desired position, gimbals carried by said bracket, a tracer rod mounted in said gimbals, a work holder, a graver and compensating connection between said tracer rod and said graver.

17. In an engraving machine of the character described, the combination with a series of type having lugs upon them, of a type holder in which said type are set up in lines, said type holder having a longitudinal flange along its upper edge, a type rack comprising clamping jaws adapted to engage the flange of the said type holder, means for tracing the type, and means for reproducing the designs carried thereon, substantially as described.

18. In an engraving machine, the combination with a work holder, of an adjustable frame carrying said work holder, a copy or guide holding board, an index or pointer carried by said adjustable frame and adapted to pass over the copy or guide carried by said board, whereby the work holder may be adjusted relative to the said guide without measurement.

19. In an engraving machine, the combination with a work holder, of an adjustable frame upon which said work holder is mounted, a second frame upon which the first frame is mounted and capable of adjustment in a direction at right angles to the first, means for adjusting the frames, a support fixed relative to the adjustment of said frames and adapted to carry a copy or guide, and an index or pointer carried by said second frame and adapted to pass over said copy or guide, whereby the work holder may be adjusted relative to the said guide without measurement.

20. In an engraving machine, the combination with a graver, of a swinging tool holder, a pivoted bar to which said holder is secured, a bracket on which said bar is pivoted, a frame carrying said bracket, upright pivoted supports in which said frame is pivoted, a tracer rod, and compensating universal connection between said rod and said frame, means for supporting said rod whereby the proportion and character of the reproduction to the design from which it is reproduced may be varied, said means comprising adjustably mounted gimbals with means for shifting the pivots of one ring with respect to those of another, movement communicating connection between said tracer rod and said frame, and means for supporting the work and design to be reproduced, substantially as described.

21. In an engraving machine, the following instrumentalities, viz.; means for supporting a pattern, and means for holding the work in said machine, a tracer rod and a pivotal support therefor, a bracket carried by one end of said rod and a compensating bar carried by said bracket, a pivoted frame, operative connection between said compensating bar and said frame, a swinging tool holder carried by said frame, and a tool mounted in said holder, substantially as described.

22. In an engraving machine, the combination with an adjustable work holder, of a swinging tool holder, a graver carried by said tool holder, a frame carrying said tool holder, a tracer rod, gimbals forming a pivotal support for said rod, a bracket secured at one end of said rod, a compensating bar pivoted in said bracket, and a universal joint connecting said compensating bar with said frame.

23. In an engraving machine, the combination with an adjustable work holder, of a swinging tool holder, a graver carried by said tool holder, a pivoted frame carrying said tool holder, a telescopic tracer rod, gimbals forming a pivotal support for said rod, a bracket secured to one end of said rod, a compensating bar pivoted in said bracket, a ball and socket joint connecting said compensating bar with said frame, and a pattern holder, substantially as described.

24. In an engraving machine, the combination with an adjustable work holder, of a swinging tool holder, a graver carried by said tool holder, a pivoted frame carrying said tool holder, a telescopic tracer rod, adjustable gimbals forming a pivotal support for said rod, a bracket secured to one end of said rod, a compensating bar pivoted in said bracket, a ball and socket joint connecting said compensating bar with said frame, and a pattern holder, substantially as described.

25. In an engraving machine, the combination with an adjustable work holder having compound sliding jaws, of a swinging tool holder, a graver carried by said tool holder, a pivoted frame carrying said tool holder, a telescopic tracer rod, adjustable gimbals forming a pivotal support for said rod, a bracket secured to one end of said rod, a compensating bar pivoted in said bracket, a ball and socket joint connecting said compensating bar with said frame, and a pattern holder, substantially as described.

26. An engraving machine, comprising a pattern holder, a hinged work holder adapted to swing away from the tool and to hold a plate thereon, a spindle pivoted to swing freely both vertically and horizontally and terminating at one end in a tracing point, a pivoted support for said spindle, a graver mounted near the opposite end of said spindle, mechanism for holding said graver at right angles to said plate, and means operated by said spindle for moving said graver, substantially as described.

27. An engraving machine, comprising a pattern holder, a work holder adapted to hold a plate, a spindle terminating at one end in a tracing point, a pivoted support for said spindle, a graver mounted near the opposite end of said spindle, a series of pivoted frames and means coöperating therewith to hold said graver at right angles to said plate, and means operated by said spindle for moving said graver, substantially as described.

28. An engraving machine comprising a pattern holder, a work-holder adapted to hold a plate, a spindle terminating at one end in a tracing point, a pivoted support for said spindle, a graver mounted near the opposite end of said spindle, a frame pivoted to swing about one of its edges, a second frame pivoted to the first and swinging about an axis parallel to the axis of the first frame, a third frame carrying a graver and pivoted to said second frame, and means operated by said spindle for moving said graver, substantially as described.

29. An engraving machine, comprising a pattern holder, a work holder adapted to swing away from the tool and to hold a plate, a spindle, a rod telescopically mounted in said spindle and terminating at its outer end in a tracing point, a pivoted support for said spindle consisting of two gimbal rings, the one longitudinally adjustable relative to the other, and both movable lengthwise along said spindle, a graver mounted near the opposite end of said spindle, means for moving said graver toward and away from the plate, and mechanism for holding said graver at right angles to said plate, and means operated by said spindle for moving said graver, substantially as described.

30. An engraving machine, comprising a pattern holder, a work holder adapted to hold a plate, a spindle terminating at one end in a tracing point, a pivoted support for said spindle consisting of two gimbal rings, the one longitudinally adjustable relative to the other, and both movable lengthwise along said spindle, a graver mounted near the opposite end of said spindle, a series of pivoted frames coöperating to hold said graver at right angles to said plate, and means operated by said spindle for moving said graver, substantially as described.

31. An engraving machine, comprising a pattern holder, a work holder adapted to hold a plate, a spindle terminating at one end in a tracing point, a pivoted support for said spindle consisting of two gimbal rings, the one longitudinally adjustable relative to the other, and both movable lengthwise along said spindle, a graver mounted near the opposite end of said spindle, a pivoted swinging frame, and a transverse swinging frame pivoted thereto, with a frame carrying the graver and pivoted to said transverse frame, and means operated by said spindle for moving said graver, substantially as described.

32. A machine of the character described, comprising a pivoted spindle, a tracer telescopically mounted in the end of and coaxial with said spindle, a graver, means for moving said graver operated by the movement of said tracer, means for holding said graver against the plate at a constant pressure and means independent of said tracer for maintaining the graver at a constant angle to the surface of said plate, substantially as described.

33. A machine of the character described, comprising a spindle, a tracer mounted in the end of and coaxial with said spindle, a graver, means for moving said graver operated by the movement of said tracer, and a series of pivoted frames with means coöperating therewith to maintain the graver at a constant angle to the surface of said plate, substantially as described.

34. A machine of the character described, comprising a spindle, a tracer telescopically mounted in the end of and coaxial with said spindle, a pivoted support for said spindle comprising two gimbal rings, the one longitudinally adjustable relative to the other, a graver, means for moving said graver operated by the movement of said tracer, and independent means for maintaining the graver at a constant angle to the surface of said plate, substantially as described.

35. A machine of the character described, comprising a spindle, a tracer telescopically mounted in the end of and coaxial with said spindle, a pivoted support for said spindle comprising two gimbal rings, the one longitudinally adjustable relative to the other, and both adjustable lengthwise along said spindle, a graver, means for moving said graver operated by the movement of said tracer, and independent means for maintaining the graver perpendicular to the surface of said plate, substantially as described.

36. An engraving machine, comprising a pattern holder, a work holder adapted to hold a plate thereon, a spindle carrying at one end and coaxial therewith a tracing point, a pivoted support for said spindle, a graver mounted near the opposite end of said spindle, mechanism for holding said graver at right angles to said plate, means for normally pressing said graver toward the plate, and means controlled by the operator for withdrawing the graver from the plate, substantially as described.

37. An engraving machine, comprising a pattern holder, a work holder adapted to hold a plate, a spindle carrying at one end and coaxial therewith a tracing point, a pivoted support for said spindle, a graver mounted near the opposite end of said spindle, a series of pivoted frames and means coöperating therewith to hold said graver at right angles to said plate, and to press said graver toward the plate, means controlled by the operator for withdrawing the graver from the plate, and means operated by said spindle for moving said graver, substantially as described.

38. An engraving machine, comprising a pattern holder, a work holder adapted to hold a plate, a spindle carrying at one end and coaxial therewith a tracing point, a pivoted support for said spindle, a graver mounted near the opposite end of said spindle, a swinging frame pivoted along one edge, and a transverse swinging frame having pivots parallel to the first, a frame carrying the graver pivoted to said transverse frame, means acting on said graver carrying frame for pressing said graver toward the plate, means controlled by the operator for withdrawing the graver from the plate, and means operated by said spindle for moving said graver, substantially as described.

39. An engraving machine, comprising a pattern holder, a work-holder adapted to hold a plate, a spindle carrying at one end and coaxial therewith a tracing point, a pivoted support for said spindle consisting of two gimbal rings, the one longitudinally adjustable relative to the other, and both movable lengthwise along said spindle, a graver mounted near the opposite end of said spindle, mechanism for holding said graver at right angles to said plate, means for normally pressing said graver toward the plate, means controlled by the operator for withdrawing the graver from the plate, and means operated by said spindle for moving said graver, substantially as described.

40. An engraving machine, comprising a pattern holder, a work holder adapted to hold a plate, a spindle carrying at one end a tracing point, a pivoted support for said spindle consisting of two gimbal rings, the one longitudinally adjustable relative to the other, and both movable lengthwise along said spindle, a graver mounted near the opposite end of said spindle, a series of pivoted frames coöperating to hold said graver at right angles to said plate, means acting on one of said frames for normally pressing said graver toward the plate, and means controlled by the operator for withdrawing the graver from the plate, and means operated by said spindle for moving said graver, substantially as described.

41. An engraving machine, comprising a pattern holder, a work holder adapted to hold a plate, a spindle carrying at one end a tracing point, a pivoted support for said spindle consisting of two gimbal rings, the one longitudinally adjustable relative to the other, and both movable lengthwise along said spindle, a graver mounted near the opposite end of said spindle, a longitudinally pivoted swinging frame, and a transverse swinging frame pivoted thereto, with a frame carrying the graver pivoted to said transverse frame, means acting on said graver carrying frame for normally pressing said graver toward the plate, and means controlled by the operator for withdrawing the graver from the plate, and means operated by said spindle for moving said graver, substantially as described.

42. A machine of the character described, comprising a spindle, a tracer mounted in the end of and coaxial with said spindle, a graver, means for moving said graver operated by the movement of said tracer, and means independent of said tracer for maintaining the graver at a constant angle to the surface of said plate, means for normally pressing said graver toward the plate, and means controlled by the operator for withdrawing the graver from the plate, substantially as described.

43. A machine of the character described, comprising a spindle, a tracer mounted in the end of and coaxial with said spindle, a graver, means for moving said graver operated by the movement of said tracer and a series of pivoted frames with means coöperating therewith to maintain the graver at a constant angle to the surface of said plate, and to normally press said graver toward the plate, and means controlled by the operator for withdrawing the graver from the plate, substantially as described.

44. A machine of the character described, comprising a spindle, a tracer mounted in the end of and coaxial with said spindle, a pivoted support for said spindle comprising two gimbal rings, the one longitudinally adjustable relative to the other, a graver, means for moving said graver operated by the movement of said tracer, and independent means for maintaining the graver at a constant angle to the surface of said plate, means for normally pressing said graver toward the plate, and means controlled by the operator for withdrawing the graver from the plate, substantially as described.

45. A machine of the character described, comprising a spindle, a tracer mounted in the end of and coaxial with said spindle, a pivoted support for said spindle comprising two gimbal rings, the one longitudinally adjustable relative to the other, and both adjustable lengthwise along said spindle, a graver, means for moving said graver operated by the movement of said tracer, and independent means for maintaining the graver perpendicular to the surface of said plate, means for normally pressing said graver toward the plate, and means controlled by the operator for withdrawing the graver from the plate, substantially as described.

46. In a machine of the character described, including a plate holder, the combination of a tracer rod pivoted in gimbals near one end thereof and carrying a tracer telescopically mounted in the opposite end, a graver, means for pressing said graver against the plate and for withdrawing same when desired, and mechanism controlled by the movement of said tracer rod for moving said graver, over the face of the plate, substantially as described.

47. In a machine of the character described, including a plate holder, the combination of a tracer rod carrying a tracer at one end, gimbal bearings supporting said tracer rod near the opposite end, a graver, a weight, and mechanism operated thereby for pressing the graver against the plate with a predetermined pressure, means for withdrawing said graver from the plate against the action of said weight, and mechanism controlled by the movement of said tracer rod for moving said graver over the face of the plate, substantially as described.

48. An apparatus comprising a plate holder, a type or design, and a type holder, a tracer rod mounted in universal bearings between the plate holder and the type holder, a tracer carried by said rod, a graver located at the opposite end of said rod from said tracer, means for pressing said graver toward the plate, independent of said tracer rod, and means operated by said tracer rod for moving said graver over the face of the plate, substantially as described.

49. An apparatus comprising a plate holder, a type or design, and a type holder, a tracer rod mounted in universal bearings between the plate holder and the type holder, and provided with a tracer at one end thereof, a graver mounted at the opposite end of said rod from said tracer, means for pressing said graver toward the plate with a predetermined pressure, and means for withdrawing said graver backward from the plate when desired, with mechanism operated by said tracer rod for moving said graver over the face of the plate, substantially as described.

50. An apparatus comprising a plate holder, a type or design, and a type holder, a tracer rod mounted in universal bearings between the plate holder and the type holder, and provided with a tracer at one end thereof, a graver mounted near the opposite end of said tracer rod, a weight with mechanism operated thereby for pressing said graver toward the plate with a predetermined pressure, independent means for moving said graver backward against the action of said weight, and mechanism controlled by said tracer rod for moving said graver over the face of the plate, substantially as described.

51. In a machine of the character described, comprising a plate holder, the combination of a hollow tracer rod mounted to swing about two axes substantially at right angles to each other, with means for shifting either or both of said axes longitudinally on said rod, and a tracer telescopically mounted in one end of said rod, of a graver, means for holding said graver at right angles to the face of the plate while in engagement with said plate, and mechanism for moving said graver over the face of the plate, controlled by said tracer rod, substantially as described.

52. In a machine of the character described, including a plate holder, the combination of a hollow tracer rod mounted to swing about two axes substantially at right angles to each other, with means for shifting either or both of said axes longitudinally on said rod, and a tracer telescopically mounted in one end of said rod, of a graver, and mechanism for moving said graver over the face of the plate, controlled by said tracer rod, means for holding said graver at right angles to the face of the plate while in engagement with said plate, with independent means for pressing said graver against the face of said plate, and other means for withdrawing the graver from the face of the plate when desired, substantially as described.

53. In a machine of the character described, including a plate holder, the combination of a tracer rod carrying a tracer at one end, gimbal bearings supporting said tracer near the opposite end, a graver, means for holding said graver at right angles to the face of the plate while in engagement with said plate, means for pressing the graver against the plate, means for withdrawing the graver backwardly from said plate when desired, and mechanism controlled by the movement of said tracer rod for moving said graver over the face of the plate, substantially as described.

54. An engraving machine, comprising a pattern holder, a work holder adapted to hold a plate, a tracer rod terminating at one end in a tracing point, a pivoted support for said rod consisting of two gimbal rings, the inner being longitudinally adjustable relative to the outer, and both movable lengthwise along said rod, a graver, a series of pivoted frames coöperating to hold said graver at a constant angle to said plate, and means operated by said rod for moving said graver transversely to the plate, substantially as described.

55. An engraving machine, comprising a pattern holder, a work holder adapted to hold a plate, a tracer rod terminating at one end in a tracing point, a pivoted support for said rod consisting of two gimbal rings, the inner being longitudinally adjustable relative to the outer, and both movable lengthwise along said rod, a graver, a pivoted swinging frame, and a transverse swinging frame pivoted thereto, with a frame carrying the graver pivoted to said transverse frame, and means operated by said tracer rod for moving said graver transversely to the plate, substantially as described.

56. An engraving machine, comprising a pattern holder, a work holder adapted to hold a plate, a tracer rod carrying at one end a tracing point, a pivoted support for said rod, a graver mounted near the opposite end of said rod, a series of pivoted frames and means coöperating therewith to hold said graver at a constant angle to said plate, means for normally pressing said graver toward the plate, means controlled by the operator for withdrawing the graver from the plate, and means operated by said rod for moving said graver transversely to the plate, substantially as described.

57. An engraving machine, comprising a pattern holder, a work holder adapted to hold a plate, a tracer rod carrying at one end a tracing point, a pivoted support for said rod, a graver, a swinging frame pivoted along one edge, and a transverse swinging frame having pivots parallel to the first, a frame carrying the graver pivoted to said transverse frame, means for normally pressing said graver toward the plate, means controlled by the operator for withdrawing the graver from the plate, and means operated by said rod for moving said graver transversely to the plate, substantially as described.

58. An engraving machine, comprising a pattern holder, a work holder adapted to hold a plate, a tracer rod carrying at one end a tracing point, a pivoted support for said rod consisting of two gimbal rings, the inner being longitudinally adjustable relative to the outer, and both movable lengthwise along said rod, a graver mounted near the opposite end of said rod, mechanism for holding said graver at a constant angle to said plate, means for normally pressing said graver toward the plate, means controlled by the operator for withdrawing the graver from the plate, and means operated by said rod for moving said graver transversely to the plate, substantially as described.

59. An engraving machine, comprising a pattern holder, a work holder adapted to hold a plate, a tracer rod carrying at one end a tracing point, a pivoted support for said rod consisting of two gimbal rings, the inner being longitudinally adjustable relative to the outer, and both movable lengthwise along said rod, a graver, a series of pivoted frames operating to hold said graver at a constant angle to said plate, means for normally pressing said graver toward the plate, means controlled by the operator for withdrawing the graver from the plate, and means operated by said tracer rod for moving said graver transversely, substantially as described.

60. An engraving machine, comprising a pattern holder, a work holder adapted to hold a plate, a tracer rod carrying at one end a tracing point, a pivoted support for said rod consisting of two gimbal rings, the inner being longitudinally adjustable relative to the outer, and both movable lengthwise along said spindle, a graver, a longitudinally pivoted swinging frame, and a transverse swinging frame pivoted thereto, with a frame carrying the graver pivoted to said transverse frame, means for normally pressing said graver toward the plate, means controlled by the operator for withdrawing the graver from the plate, and means operated by said tracer rod for moving said graver, substantially as described.

61. A machine of the character described, comprising a tracer rod, a tracer tool mounted in the end of said rod, a graver, means for moving said graver operated by the movement of said tracer rod, and means independent of said tracer for maintaining the graver at a constant angle to the surface of said plate, means for normally pressing said graver toward the plate, means controlled by the operator for withdrawing the graver from the plate, substantially as described.

62. A machine of the character described, comprising a tracer rod, a tracer tool telescopically mounted at the end of said rod, a graver, means for moving said graver operated by the movement of said tracer rod and a series of pivoted frames with means coöperating therewith to maintain the graver at a constant angle to the surface of said plate, means for normally pressing said graver toward said plate, means controlled by the operator for withdrawing the graver from the plate, and means operated by said tracer rod for moving said graver transversely to the plate, substantially as described.

63. A machine of the character described, comprising a tracer rod, a tracer tool mounted at the end of said tracer rod, a pivoted support for said rod comprising two gimbal rings, the inner being longitudinally adjustable relative to the outer, a graver, means for moving said graver operated by the movement of said tracer rod, and independent means for maintaining the graver at a constant angle to the surface of said plate, means for normally pressing said graver toward the plate, and means controlled by the operator for withdrawing the graver from the plate, substantially as described.

64. A machine of the character described, comprising a tracer rod, a tracer tool mounted at the end of said rod, a pivoted support for said rod, comprising two gimbal rings, the inner being longitudinally adjustable relative to the outer, and both adjustable lengthwise along said rod, a graver, means for moving said graver operated by the movement of said tracer, and independent means for maintaining the graver perpendicular to the surface of said plate, means for normally pressing said graver toward the plate, means controlled by the operator for withdrawing the graver from the plate, substantially as described.

65. In a machine of the character described, the combination with a plate and plate holder, of a tracer rod mounted to swing about two axes substantially at right angles to each other, with means for shifting one of said axes longitudinally on said rod, of a graver, means for holding said graver at right angles to the face of the plate while in engagement with said plate, and mechanism for moving said graver over the face of the plate controlled by said tracer rod, substantially as described.

66. In a machine of the character described, the combination with a plate and plate holder, of a tracer rod carrying a tracer tool at one end, gimbal bearings supporting said tracer rod near the opposite end, a graver, means for holding said graver at right angles to the face of the plate while in engagement with said plate, means for pressing the graver against the plate, means for withdrawing the graver from the plate when desired, and mechanism controlled by the movement of said tracer rod for moving said graver over the face of the plate, substantially as described.

In testimony whereof, I affix my signature, in presence of two witnesses.

JOSIAH PERCIVAL STEVENS.

Witnesses:
 D. B. DE SAUSSURE,
 R. B. CUNNINGHAM.